United States Patent
Liu

(10) Patent No.: US 10,862,386 B2
(45) Date of Patent: Dec. 8, 2020

(54) ELECTRIC MOTOR

(71) Applicant: Shiqiao Liu, Yichang (CN)

(72) Inventor: Shiqiao Liu, Yichang (CN)

(*) Notice: Subject to any disclaimer, the term of this patent is extended or adjusted under 35 U.S.C. 154(b) by 220 days.

(21) Appl. No.: 15/682,601

(22) Filed: Aug. 22, 2017

(65) Prior Publication Data

US 2018/0358882 A1  Dec. 13, 2018

(30) Foreign Application Priority Data

Jun. 12, 2017  (EP) .................................. 17175421

(51) Int. Cl.
- *H02K 99/00* (2014.01)
- *H02K 1/22* (2006.01)
- *H02K 1/17* (2006.01)
- *H02K 53/00* (2006.01)
- *H02K 21/28* (2006.01)

(52) U.S. Cl.
CPC ............... *H02K 99/20* (2016.11); *H02K 1/17* (2013.01); *H02K 1/22* (2013.01); *H02K 21/28* (2013.01); *H02K 53/00* (2013.01)

(58) Field of Classification Search
CPC ........ H02K 99/20; H02K 53/00; H02K 21/28; H02K 1/17; H02K 1/22; H02K 17/30
USPC .................................................... 310/300, 72
See application file for complete search history.

(56) References Cited

U.S. PATENT DOCUMENTS

| | | | | |
|---|---|---|---|---|
| 4,064,442 A | * | 12/1977 | Garron | H02K 25/00 318/400.3 |
| 4,206,395 A | * | 6/1980 | Okuyama | H02J 3/1892 318/716 |
| 6,847,186 B1 | * | 1/2005 | Kerlin | H02K 99/20 318/747 |
| 2003/0038609 A1 | * | 2/2003 | Shien | H02K 17/02 318/751 |
| 2004/0227486 A1 | * | 11/2004 | Kerlin | H02P 7/28 318/807 |
| 2005/0109879 A1 | * | 5/2005 | Patterson | F03H 99/00 244/53 R |
| 2011/0116586 A1 | * | 5/2011 | Chang | H03L 7/185 375/376 |
| 2012/0325646 A1 | * | 12/2012 | Wilkinson | B01J 19/088 204/156 |
| 2016/0105139 A1 | * | 4/2016 | Tillotson | H02K 37/08 318/16 |

(Continued)

OTHER PUBLICATIONS

Received STIC search report from EIC 2800 searcher John DiGeronimo dated Apr. 5, 2019. (Year: 2019).*

*Primary Examiner* — Emily P Pham
*Assistant Examiner* — Htet Z Kyaw
(74) *Attorney, Agent, or Firm* — Ladas & Parry LLP; Malcom J. MacDonald

(57) ABSTRACT

The present invention discloses a novel electric motor, which comprises a stator and a rotor. The stator is a permanent magnet. The rotor comprises a rotor coil and a capacitor. The rotor coil and the capacitor are connected in series to form a resonant driving circuit. The resonant driving circuit is used to convert a natural electromagnetic field into a current to drive the rotor to rotate. The motor of the present invention can rotate without any external power, thereby solving the technical problem that the use of the external power makes a restriction to the further development and application of the motor, and solving the problem of motor energy consumption.

1 Claim, 1 Drawing Sheet

(56) References Cited

U.S. PATENT DOCUMENTS

2017/0076942 A1* 3/2017 Curran ................... C07F 7/21
2018/0062485 A1* 3/2018 Moreno Magdaleno ...................
                                                            H02P 1/26

* cited by examiner

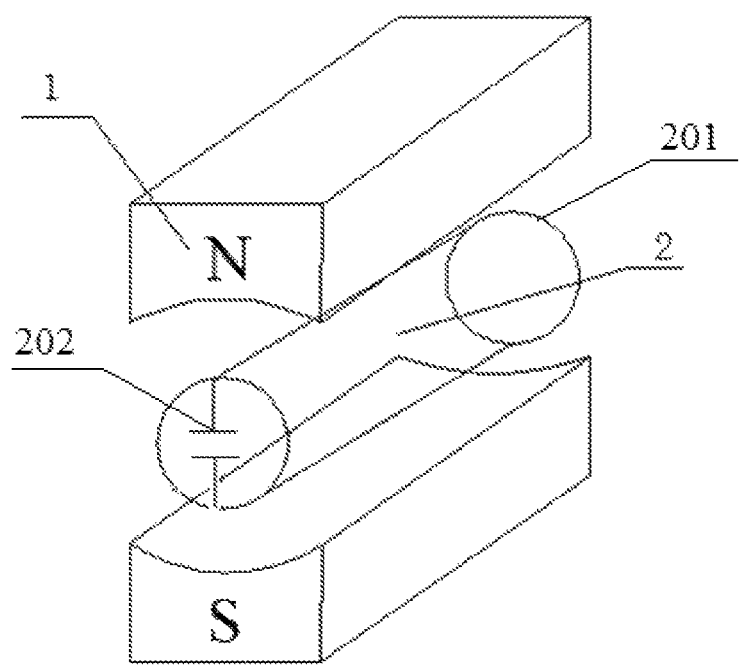

ELECTRIC MOTOR

TECHNICAL FIELD

The present invention relates to the field of electric motors, and more particularly to a novel electric motor.

BACKGROUND

Motors, as a kind of power drive device, are widely used. However, the existing motors need an external power to drive, which restricts their further development and application. For example, in the case of electric vehicles, because the motor needs an external power to drive, a large-capacity power battery is required to store energy, and even in this case the endurance mileage of the electric vehicles is still limited. There are a variety of energy sources in nature, in which wind and solar energy are well applied, but, in addition to being used for signal transmission, the electromagnetic field in nature, has not be applied as energy yet. How to make the natural electromagnetic field as a kind of energy used to realize the electric motor rotation, thereby to solve the technical problem that the use of the external power makes a restriction to the further development and application of the motor, is of great significance.

SUMMARY

The object of the present invention is to solve the problem of energy shortage by using the electromagnetic field in nature as an energy source to realize the rotation of the electric motor.

In order to achieve the above object, the present invention provides the following technical scheme:

A novel electric motor comprises a stator and a rotor. The stator is a permanent magnet. The rotor comprises a rotor coil and a capacitor. The rotor coil and the capacitor are connected in series to form a resonant driving circuit. The frequency of the resonant driving circuit is consistent with that of the natural specific electromagnetic field. The resonant driving circuit is used to convert the natural specific electromagnetic field into a current flowing through the rotor coil, thereby to drive the rotor to rotate.

The frequency of the resonant driving circuit is 4080 megahertz, which is consistent with that of the natural cosmic background radiation.

According to embodiments of the present invention, the present invention discloses the following technical effects:

The present invention discloses a novel electric motor and an implementation method thereof. The rotor coil and the capacitor are connected in series to form a resonant driving circuit, and the frequency of the resonant driving circuit is required to keep consistent with that of the natural specific electromagnetic field so as to convert the natural specific electromagnetic field into a current flowing through the rotor coil, thereby to realize rotation of the motor without any external power. This solves the technical problem that the use of the external power makes a restriction to the further development and application of the motor, and also solves the problem of motor energy consumption.

BRIEF DESCRIPTION OF THE DRAWING

In order to illustrate embodiments of the present invention more clearly, a simple description will be made below about a drawing referred to in the embodiments. Apparently, the drawing described below depicts only one embodiment of the present invention, and other relevant drawings can also be obtained by those skilled in the art based on the drawing without any creative effort.

FIG. 1 is a schematic view of a novel electric motor according to the present invention.

DETAILED DESCRIPTION

The object of the present invention is to provide a novel electric motor and an implementation method thereof.

In order to make the foregoing object, features and advantages more clear and obvious, the present invention will now be described in detail with reference to the drawing and the embodiments hereinafter.

As shown in FIG. 1, the present invention provides a novel electric motor, which includes a stator 1 and a rotor 2. The stator 1 is a permanent magnet. The rotor 2 includes a rotor coil and a capacitor. The rotor coil and the capacitor are connected in series to form a resonant driving circuit. The frequency of the resonant driving circuit is consistent with that of the specific electromagnetic field in nature. The resonant driving circuit converts the natural specific electromagnetic field into a current flowing through the rotor coil, thereby to drive the rotor 2 to rotate.

The frequency of the resonant driving circuit is 4080 megahertz (MHz), which is consistent with that of the natural cosmic background radiation.

The size of output power of the resonant driving circuit is determined by the impedance of the rotor coil, and the resonant circuits with different power should be made of different materials.

The work process of the novel electric motor is as follows: when the natural specific electromagnetic field, the frequency of which is consistent with that of the resonant driving circuit, passes through the resonant driving circuit, an electromagnetic resonance is formed in the resonant driving circuit; under the action of the electromagnetic resonance, the resonant driving circuit generates a maximum current; the current flows through the rotor coil to drive the rotor to rotate.

The electromagnetic resonance is formed in the resonant driving circuit as follows: when the natural specific electromagnetic field, the frequency of which is consistent with that of the resonant driving circuit, passes through the resonant driving circuit, an induced electric field is generated in the capacitor of the resonant driving circuit, and an induced magnetic field is generated in the rotor coil of the resonant driving circuit, thereby to form the electromagnetic resonance.

Specifically, the specific electromagnetic field in the nature whose frequency is consistent with that of the resonant driving circuit is the cosmic background radiation with a frequency of 4080 MHz. The cosmic background radiation is the largest energy source in nature and can generate large currents when passing through the resonant driving circuit.

In this description, specific examples are used to illustrate the technical principle and the implementation of the present invention, and the foregoing illustration of the embodiments is only to help in understanding the technical method and the core idea of the present invention. The embodiments described are only certain particular embodiments of the present invention, and are not all of embodiments thereof. Based on the embodiments of the present invention, all the other embodiments obtained by those skilled in the art without any creative work are within the scope of the present invention.

What is claimed is:

1. A novel electric motor, comprising a stator and a rotor, wherein:

the stator comprises a permanent magnet, and the rotor comprises a rotor coil and a capacitor;

wherein, the rotor coil and the capacitor are connected in series to form a resonant driving circuit having a resonant frequency of 4080 Megahertz, whereby when the motor is within an electromagnetic field of 4080 Megahertz, an electromagnetic resonance is formed in the resonant driving circuit, causing current to flow through the rotor coil, thereby driving the rotor to rotate;

and wherein the electromagnetic resonance is formed in the resonant driving circuit as follows:

when the electromagnetic field of 4080 Megahertz, the frequency of which is consistent with that of the resonant driving circuit, passes through the resonant driving circuit, an induced electric field is generated in the capacitor of the resonant driving circuit, and an induced magnetic field is generated in the rotor coil of the resonant driving circuit, thereby forming the electromagnetic resonance; and the resonant driving circuits with different power arc made of different materials have different output powers.

* * * * *